United States Patent
Perry

(10) Patent No.: US 7,347,298 B2
(45) Date of Patent: Mar. 25, 2008

(54) GEAR SECURE

(76) Inventor: Alvin Perry, 3218 Fern Ave., Palmale, CA (US) 93550

( * ) Notice: Subject to any disclaimer, the term of this patent is extended or adjusted under 35 U.S.C. 154(b) by 406 days.

(21) Appl. No.: 10/994,624

(22) Filed: Nov. 22, 2004

(65) Prior Publication Data

US 2006/0107782 A1 May 25, 2006

(51) Int. Cl.
  *B60R 25/06* (2006.01)
  *B62H 5/08* (2006.01)
(52) U.S. Cl. ............... 180/289; 74/473.12; 74/523; 70/247
(58) Field of Classification Search ......... 74/473.1, 74/523, 529, 536, 548; 180/287, 289; 70/204
  See application file for complete search history.

(56) References Cited

U.S. PATENT DOCUMENTS

| | | | | |
|---|---|---|---|---|
| 3,564,878 A | * | 2/1971 | Seatts | 70/204 |
| 3,865,500 A | * | 2/1975 | Newell | 403/359.5 |
| 4,231,241 A | * | 11/1980 | Lipski | 70/195 |
| 4,638,882 A | * | 1/1987 | Sato | 180/287 |
| 5,211,078 A | * | 5/1993 | McCarthy et al. | 477/99 |
| 5,251,466 A | * | 10/1993 | Chang | 70/247 |
| 5,488,846 A | * | 2/1996 | Green | 70/247 |
| 5,722,452 A | * | 3/1998 | Gilmore | 137/354 |
| 5,791,175 A | * | 8/1998 | Van Wyk | 70/247 |
| 6,116,370 A | * | 9/2000 | Puigbo | 180/287 |
| 6,460,426 B1 | * | 10/2002 | Kataumi et al. | 74/473.31 |
| 6,722,711 B2 | * | 4/2004 | Kitzis | 292/145 |
| 6,927,671 B2 | * | 8/2005 | DeBono | 340/5.83 |
| 2006/0005660 A1 | * | 1/2006 | Rick et al. | 74/523 |
| 2006/0076752 A1 | * | 4/2006 | Montague et al. | 280/279 |
| 2006/0107782 A1 | * | 5/2006 | Perry | 74/523 |
| 2006/0151987 A1 | * | 7/2006 | Marks et al. | 280/848 |

* cited by examiner

*Primary Examiner*—Paul N. Dickson
*Assistant Examiner*—Karen J. Amores
(74) *Attorney, Agent, or Firm*—Raymond M. Galasso; Galasso & Associates, LP

(57) ABSTRACT

This automobile anti-theft device comprises a removable stick gear shifter, release mechanism, and possibly a second level safety release mechanism, steel ball bearing, an exclusive shaft key lock component, and electrical connections depending on the type of transmission in use. These components are designed to function in unison to allow a car operator to remove a gear shifter to prevent automobile theft.

7 Claims, 4 Drawing Sheets

GEAR SECURE

FIELD OF THE DISCLOSURE

The disclosures made herein relate generally to a vehicle theft prevention device. Gear Secure is in the same general classification of protective equipment as the steering wheel and pedal immobilizers.

BACKGROUND

Over the years, there have been many inventions to help secure automobiles from being stolen to give an owner a feeling of comfort when he/she leaves his/her automobile.

For example, audible and silent alarms have been designed to sound when a parked automobile is moved or senses motion. Unfortunately, these alarms often sound inadvertently. In fact, many people simply view these alarms as audible irritants and do not pay attention to them anymore. Even if people responded to such alarms, this type of system puts the onus on the car owner or other citizens to stop a potential car thief, potentially jeopardizing their own safety. Moreover, these audible alarms often sound alike and it can be difficult to recognize the source of the alarm. Hence, many users are forced to pay for expensive devices with more unique alarms sounds. In general, these car alarms are also not very complicated to bypass. It may only take fifteen (15) to twenty (20) seconds for a car thief to smash the window, lift the hood, and cut the wires to the siren. Alternatively, a car thief could short out the alarm with a high voltage charge even more quickly in many cases. Because the common occurrence of a car alarm sounding for 15-20 seconds will likely be ignored by most people, it will not serve as much of a deterrent for a determined car thief.

Another invention, the CLUB, is a well-known car theft prevention device that has sold tens of millions of devices through the years. The use of the CLUB is actually an antiquated idea that involves relatively primitive technology. Unfortunately, the CLUB is also fairly easily circumvented. A car thief can simply cut the steering wheel in one place with a hacksaw and remove the club and steal the car. While the CLUB is more difficult to bypass than a common car alarm, it can still be done if the car thief has sufficient time. For example, in the evening while a car owner sleeps, the car thief can probably disable the CLUB in 15 minutes or less.

Other car theft prevention accessories are also sold with the CLUB. A club cover (steel plate device that covers the steering wheel) can be utilized with the CLUB to prevent a car thief from sawing the steering wheel and removing the CLUB. However, this type of device is large and awkward to place on the steering wheel and to take off which may prevent many consumers from using it.

LoJack is another car theft prevention device that deters thieves from stealing a car because the location of the car can be tracked. However, if the car thief knows what to look for after stealing the car, he can dismantle the device in a secluded spot before a car owner even reports the car missing. Obviously, this device also can only be used as a deterrent and a determined car thief could still steal the car if he was willing to take the risk that the car might be located through the use of the LoJack system. Unlike the CLUB or the present invention, LoJack does not truly immobilize the car.

The physical kill start switch and computerized switch through an alarm are also inexpensive security features that can work well in helping to stop auto theft if the consumer is imaginative when installing it. Most consumers have their switch installed in a very common place which can be visible if the car thief should take a few seconds to look for it. Most car thieves know to look for a kill start switch if the car does start immediately. It may only take a thief a few minutes to locate this type of switch and bypass it.

Other devices, like valet keypads and keycards that are waived by the steering column, are useful, but if the consumer forgets his code or loses his keycard, he will be unable to start his car.

These devices, in the aggregate, can still be a good deterrent but do not solve the problem of automobile theft. Most thieves are able to bypass one or more of these devices.

SUMMARY OF THE DISCLOSURE

In general, the Gear Secure system comprises a removable gear shifter, release button, key, lock and possibly safety release buttons, a steel ball bearing mechanism (like used in a socket wrench) and/or electrical connections on the key and lock.

One embodiment of this invention is for use with automatic floor transmissions. In this design, a removable gear shifter can be detached from the mooring connected to the automobile's transmission. This type of removable gear shifter has a release button on the top and electrical terminals located on the bottom (key) that will send a signal to the electrical connections on the interior of the mooring (lock) to allow release of the gear shifter when the release mechanism is pressed. The bottom of the gear shifter with the electrical terminals has a unique key design to be inserted into the mooring. Electrical connections on the interior of the mooring allow the removable gear shifter to only be removed when the car is in park or the car is turned off. Hence, the removable gear shifter can only be removed when both the release mechanism is pressed and the car is in park or turned off. The interior of the mooring with the electrical connections has a unique lock design that corresponds to the key design at the bottom of the removable gear shifter.

Another embodiment of this invention is for use with automatic steering column transmissions. In this design, as with the floor automatic transmission model, a removable gear shifter can be detached from the mooring connected to the automobile's transmission. This type of removable gear shifter has a release button on the top and electrical terminals located on the bottom that will send a signal to the electrical connections on the interior of the mooring to allow release of the gear shifter when the release mechanism is pressed. The bottom of the gear shifter with the electrical terminals has a unique key design to be inserted into the mooring. Electrical connections on the interior of the mooring allow the removable gear shifter to only be removed when the car is in park or the car is turned off. Hence, the removable gear shifter can only be removed when both the release mechanism is pressed and the car is in park or turned off. The interior of the mooring has a unique lock design that corresponds to the key design at the bottom of the removable gear shifter.

Yet another embodiment of this invention is for use with manual transmissions. In this design, as with the in floor and steering wheel automatic transmission models, a gear shifter can be detached from the mooring connected to the automobile's transmission. However, unlike the automatic transmission models, the manual transmission model does not have electrical terminals located on the bottom of the removable gear shifter and in the interior of the mooring. Instead, it has one or more safety buttons on the removable gear shifter that will be pressed simultaneously with the release button located at the top of the removable gear shifter. When the release button and safety release buttons are pressed simultaneously, the removable gear shifter can be taken out of the mooring. The bottom of the removable gear shifter has a unique key design with a steel ball bearing placed inside. The interior of the mooring has a unique lock design that corresponds to the key design at the bottom of the removable gear shifter. Pressing the release button and safety release buttons activates the steel ball bearing mechanism and allows the key at the bottom of the removable gear shifter to be taken out of the lock located on the interior of the mooring.

One object of this invention is to design a car theft prevention device that will be easy to install and remove.

Another object of this invention is to produce a car theft prevention device that is unique to each vehicle in which it is installed.

Another object of this invention is to create a car theft prevention device that is difficult to bypass.

Another object of this invention is to provide a car theft prevention device that actually immobilizes a car.

Another object of this invention is to create a car theft prevention device that is inexpensive.

Yet another object of this invention is to create a car theft prevention device that can be installed or retrofitted for use in new, older and classic model cars.

DETAILED DESCRIPTION OF THE DRAWINGS

Gear Secure is an automobile theft prevention system that allows a car owner to remove his gear shifter from the automobile when he leaves the vehicle. When properly used, the Gear Secure System prevents a car from being placed in gear and stolen while the owner is away from his car.

Figure 1:
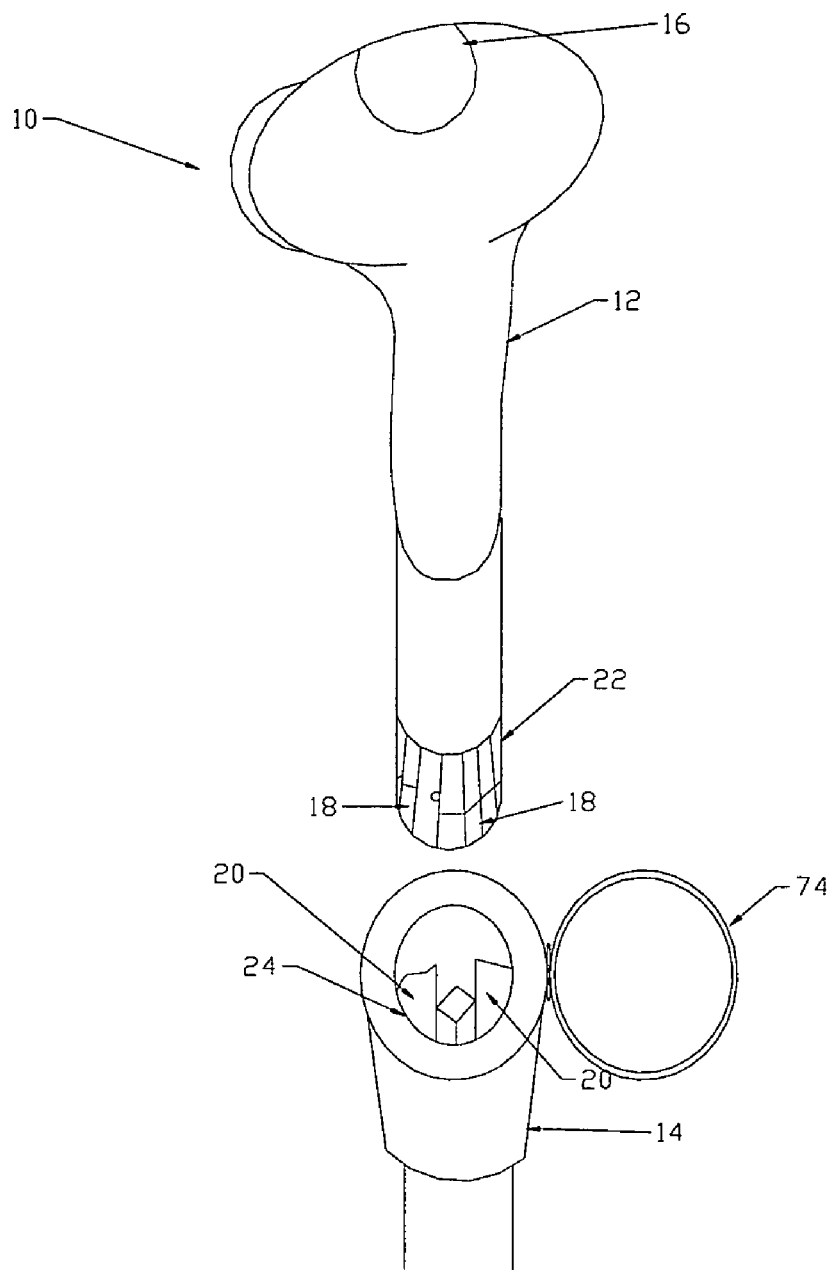
FIG. 1 depicts a perspective view of the Gear Secure System for floor automatic transmission models.

FIG. 1 depicts the preferred embodiment of Gear Secure 10 for floor automatic transmission models. In this design, a removable gear shifter 12 can be detached from its mooring 14 connected to the automobile's transmission. The removable gear shifter 12 has a release button 16 on the top and two electrical terminals 18 located on the bottom. These two electrical terminals 18 send a signal to the mooring's electrical connections 20 located on the interior of the mooring 14 to allow release of the removable gear shifter 12 only when the release button 16 is pressed. The bottom of the removable gear shifter 12 with the two electrical terminals 18 is fashioned into a unique key 22 to be inserted into the mooring 14. The mooring's electrical connections 20 allow the removable gear shifter 12 to only be removed when the car is in park or the car is turned off. Hence, the removable gear shifter 12 can only be removed when both the release button 16 is pressed and the car is in park or turned off. The interior of the mooring 14 is fashioned into a unique lock 24 that corresponds to the key 22 at the bottom of the removable gear shifter 12.

Figure 2:
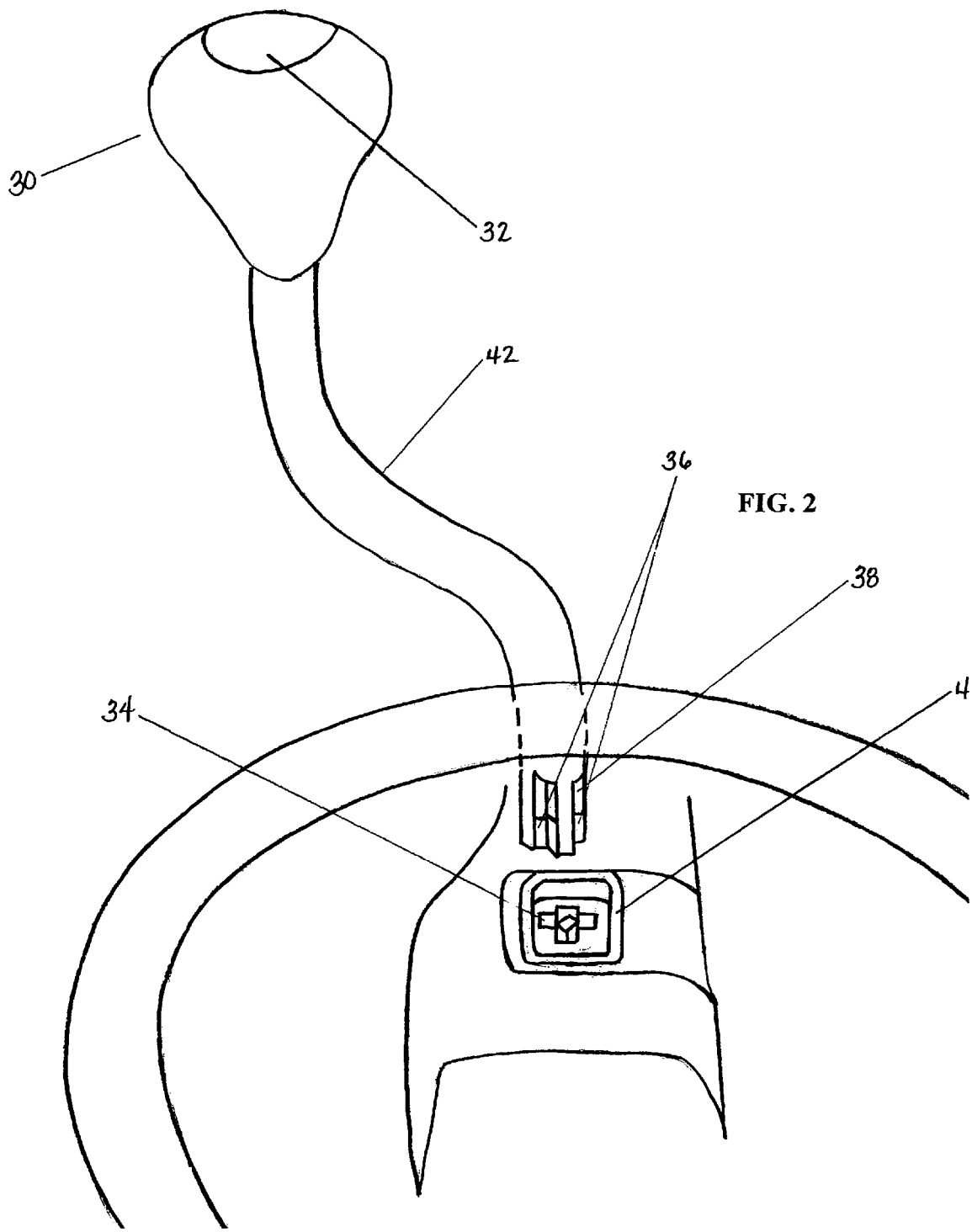
FIG. 2 depicts a perspective view of the Gear Secure System for steering column automatic transmission models.

FIG. 2 depicts the preferred embodiment of Gear Secure 30 for steering column automatic transmission models. In this design, as with the floor automatic transmission model, a removable gear shifter 42 can be detached from its mooring 34 connected to the automobile's transmission. The removable gear shifter 42 has a release button 32 on the top and two electrical terminals 36 located on the bottom. These two electrical terminals 36 send a signal to the mooring's electrical connections (not pictured) located on the interior of the mooring 34 to allow release of the removable gear shifter 42 only when the release button 32 is pressed. The bottom of the removable gear shifter 42 with the two electrical terminals 36 is fashioned into a unique key 38 to be inserted into the mooring 34. The mooring's electrical connections allow the removable gear shifter 42 to only be removed when the car is in park or the car is turned off. Hence, the removable gear shifter 42 can only be removed when both the release button 32 is pressed and the car is in park or turned off. The interior of the mooring 34 is fashioned into a unique lock 40 that corresponds to the key 38 at the bottom of the removable gear shifter 42.

Figure 3:
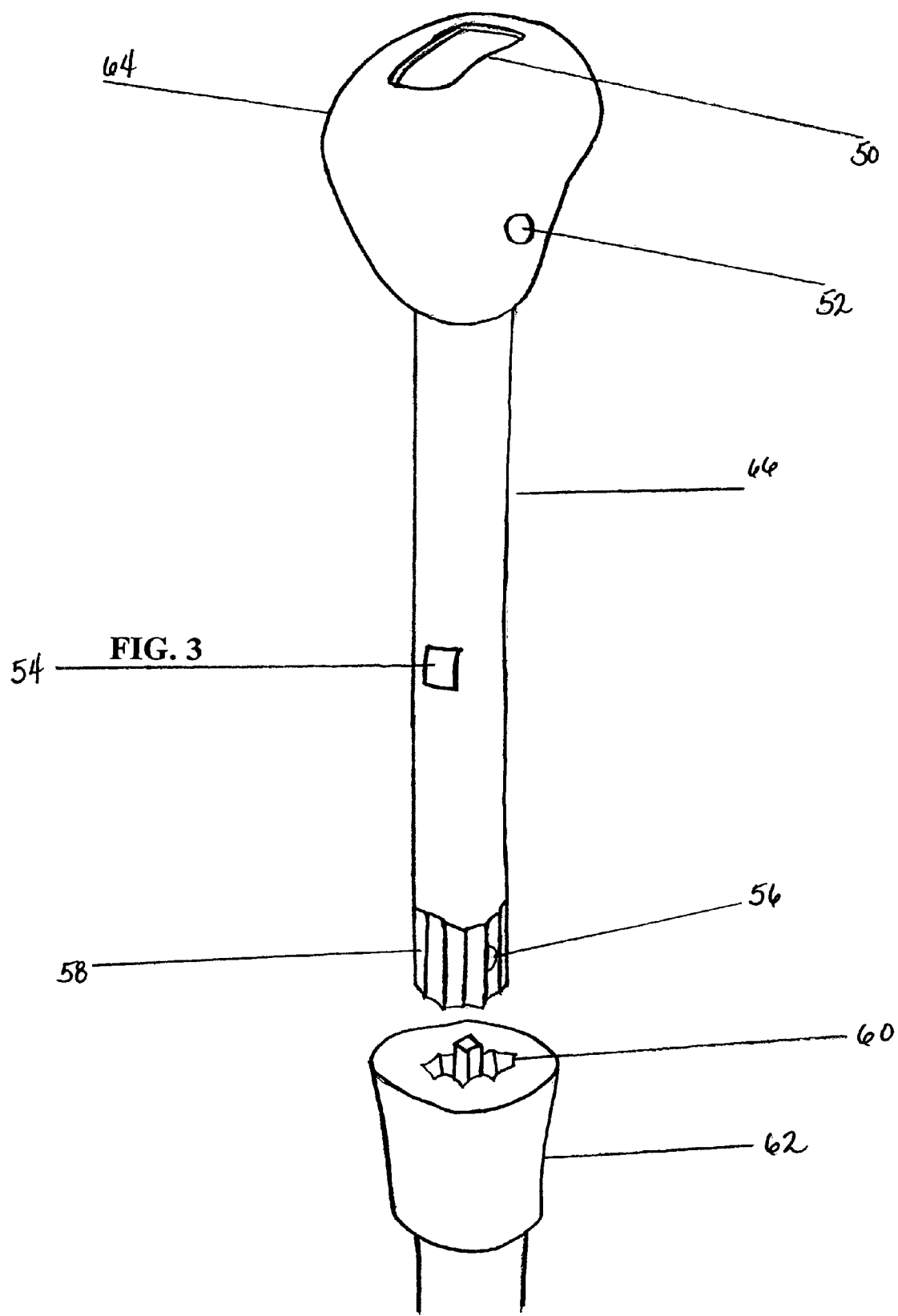
FIG. 3 depicts a perspective view of the Gear Secure System for manual transmission models.

FIG. 3 depicts the preferred embodiment of Gear Secure 64 for manual transmission models. In this design, as with the floor and steering wheel automatic transmission models, a gear shifter can be detached from the automobile's transmission. However, unlike the automatic transmission models, the manual transmission model does not have two electrical terminals located on the bottom of the removable gear shifter 66. Instead, the removable gear shifter 66 has a release button 50 on the top. The removable gear shifter 66 also has a first safety release button 52 located next to the release button 50 on top of the removable gear shifter 66. A second safety release button 54 is located on the back of the removable gear shifter 66, a few inches down from the first safety release button 52. The release button 50, first safety release button 52 and second safety release button 54 must be pressed simultaneously to remove the removable gear shifter 66 from its mooring 62. The bottom of the removable gear shifter 66 is fashioned into a unique key 58 with a steel ball bearing 56 placed inside. The interior of the mooring 62 is also fashioned into a unique lock 60 that corresponds to the key 58 at the bottom of the removable gear shifter 66. Pressing the release button 50, first safety release button 52 and second safety release button 54 activates the steel ball bearing 56 and allows the key 58 at the bottom of the removable gear shifter 66 to be taken out of the lock 60 located on the interior of the mooring 62.

The manual and automatic transmission versions of Gear Secure shown in FIGS. 1-3 could be interchanged, however, certain practical and safety considerations make this less desirable. Moreover, the location and number of release buttons, safety release buttons and electrical terminals can be manipulated without departing from the spirit of this invention. Although Gear Secure was originally designed for use with a car, other motorized vehicles may also employ the Gear Secure system.

Figure 4:
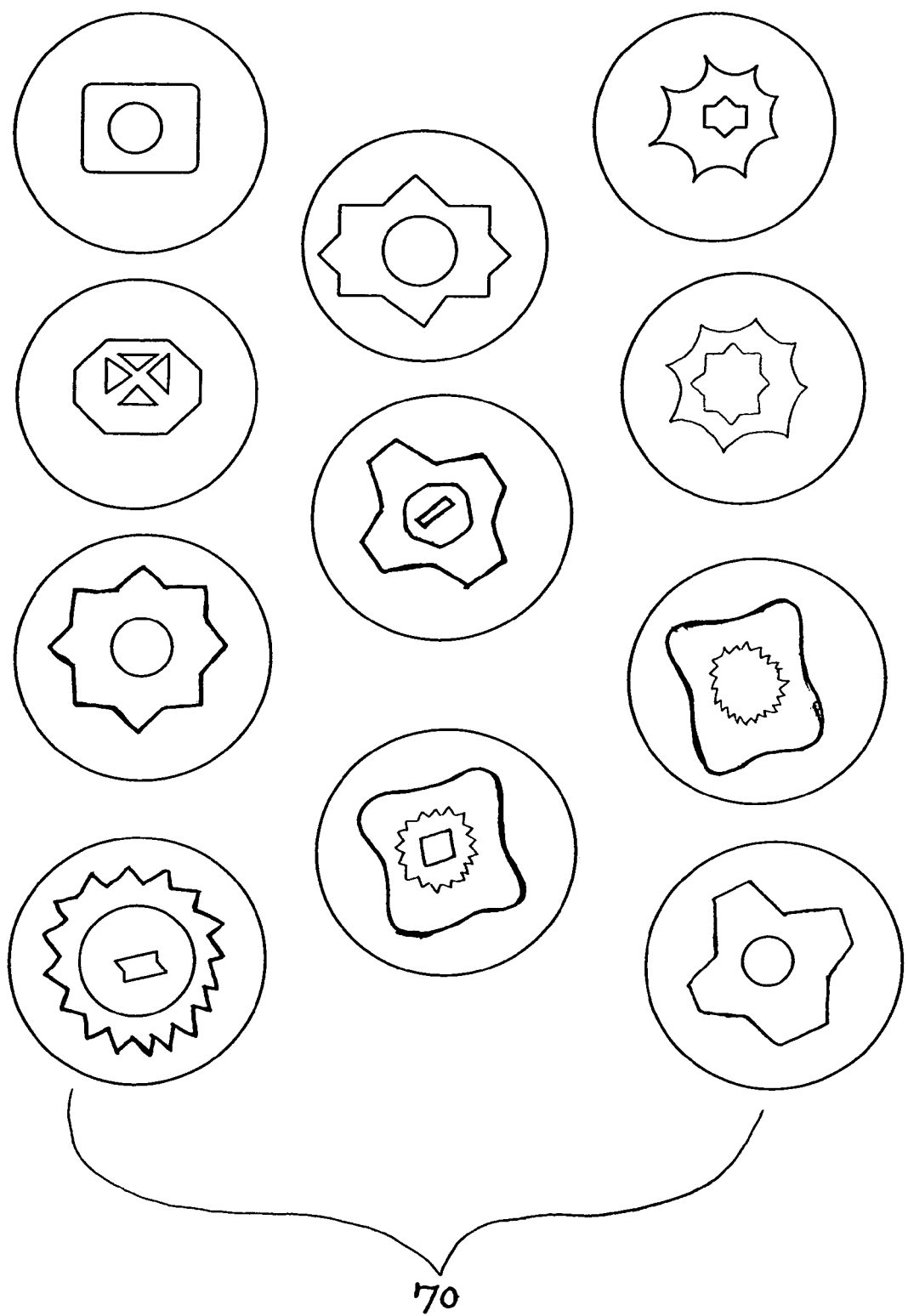
FIG. 4 depicts an overhead view of various lock designs for use in the Gear Secure System.

FIG. 4 depicts an overhead view of various sample designs for locks 70 (also shown in FIGS. 1-3 as 24, 40 and 60). In the preferred embodiment of Gear Secure, each lock and key for the removable stick will be unique in shape and size. In the event that a car thief would happen to break into a consumer's car and obtain a removable gear shifter of his own, his key will not fit in the lock of other vehicles and will not permit him to steal other vehicles. The lock and keys will have serial numbers matching the car should the removable stick malfunction or be lost. This will allow replacement by only the owner.

In the preferred embodiment of the invention, the Gear Secure system for use with all models would further include a sticker to be placed on the windshield stating "this car utilizes the Gear Secure system." This sticker would act as a further deterrent to a car thief who would likely seek an easier target if he read the sticker.

The preferred embodiment of the Gear Secure system for use with all models would further include a hinge plastic flap (74) to fit over the mooring when the removable gear shifter is removed to prevent dust and debris from entering the lock area.

Gear Secure is manufactured using several interrelated components. These components include those that allow the product to act in the manner of a standard motor vehicle gear shift lever. Gear Secure thus employs gear shift lever shafts and handgrips as well as locking mechanisms in its makeup. The length and width of the components remain relatively the same as with standard gear shift mechanisms. Of course, Gear Secure is different from these standard gear shift levers because it is easily removable due to its design and component parts discussed in FIGS. 1 through 4.

Gear Secure is constructed of the best quality materials commonly accepted and used in the manufacturing industry today. In the preferred embodiment, the metals used will be selected from available steel or alloys of steel and aluminum. The production process related to the use of these metals would insure that they were produced so as to be non-corrosive, durable and strong. The selected metals should have high impact strength and be able to accept and retain coloring materials for an extended length of time.

The plastic used in the production of the preferred embodiment of Gear Secure should also be selected for its durability and lasting traits. Thermoplastics are commonly used in the manufacturing of components similar to those designed for Gear Secure. Polyethylene, polypropylene, and other similar thermoplastic materials would be among those considered to have the desirable traits. Members of this family are recognized universally as being versatile and high quality.

The electronic components of Gear Secure will also be ideally selected from those currently having the highest industry ratings. These components would meet or exceed all safety regulations as well. Wiring and associated connecting hardware should be insulated and otherwise protected from intrusion by any harmful or degrading elements, including water, medium level temperatures, and low to medium impact force.

The method of operation for Gear Secure will ideally vary depending on whether a manual or automatic transmission car is being operated. In an automatic transmission vehicle, as a vehicle owner leaves his or her car, truck or other motorized vehicle, he or she would press the release button located on the gearshift. The automatic transmission model will have two electric terminals located on the key that will send a signal to the lock located on the transmission releasing the stick only when release button is pressed and the transmission is in the park gear or the car is turned off. The gear shift would then be removed by the owner.

In a manual transmission model, as the owner exits his vehicle, he would press the release button located on the gearshift. The first and second safety release buttons would also be pressed simultaneously with the release button on the gear shift to unlock the lock and allow the key to be removed from the lock. To accomplish this, a steel ball bearing activated mechanism will be unlocked with the activation of the release buttons. The gear shift would then be removed by the owner.

It will be recognized by those skilled in the art that changes or modifications may be made to the above-described embodiments without departing from the broad inventive concepts of the invention. It should therefore be understood that this invention is not limited to the particular embodiments described herein, but is intended to include all changes and modifications that are within the scope and spirit of the invention as set forth in the claims.

What is claimed is:

1. A theft prevention device for a motorized vehicle comprising:
   (a) a removable gear shifter;
   (b) a mooring for anchoring the removable gear shifter;
   (c) a key located at the bottom of the removable gear shifter;
   (d) a lock on the interior of the mooring that corresponds to the key located at the bottom of the removable gear shifter;
   (e) a release button on the removable gear shifter that activates a steel ball bearing located inside the key on the bottom of the removable gear shifter
   (f) a first safety release button located on the removable gear shifter; and
   (g) a second safety release button located on the removable gear shifter.

2. The theft prevention device of claim 1 further comprising:
   a release button located on the removable gear shifter that activates an electrical terminal located on the key at the bottom of the removable gear shifter.

3. The theft prevention device of claim 2 further comprising:
   electrical terminals located on the interior of the mooring.

4. The theft prevention device of claim 1 further comprising:
   a theft prevention warning sticker placed on the motorized vehicle.

5. The theft prevention device of claim 1 further comprising:
   a flap hinged to the mooring.

6. A theft prevention device for a motorized vehicle comprising:
   (a) a removable gear shifter;
   (b) a mooring for anchoring the removable gear shifter;
   (c) a key located on the bottom of the removable gear shifter;
   (d) a lock on the interior of the mooring that corresponds to the key located at the bottom of the removable gear shifter;
   (e) a release button located on the removable gear shifter that activates a steel ball bearing located inside the key on the bottom of the removable gear shifter;
   (f) a first safety release button located on the removable gear shifter;
   (g) a second safety release button located on the removable gear shifter;
   (h) a theft prevention warning sticker placed on the motorized vehicle; and
   (I) a flap hinged to the mooring.

7. A method for protecting a vehicle comprising:
   installing a gear shifter into a mooring connected to the vehicles transmission; and
   pressing the release button on the removable gear shifter that activates a steel ball bearing located inside the key on the bottom of the removable gear shifter, the first safety release button on a removable gear shifter in conjunction with the sescond safety release, button, simultaneously, and removing the removable gear shifter from the mooring.

* * * * *